April 26, 1927.
F. W. McNEELY
1,625,819
GREASE GUN
Filed Oct. 25, 1924
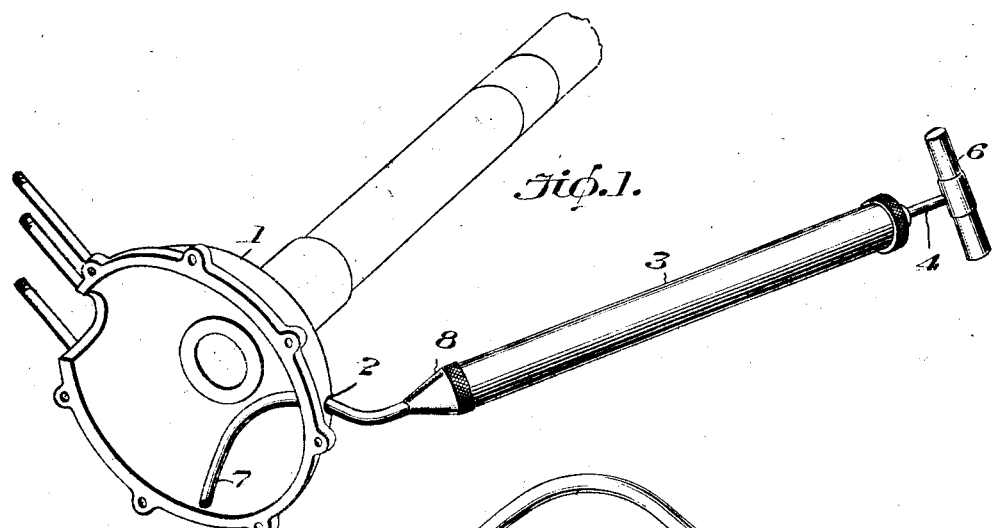
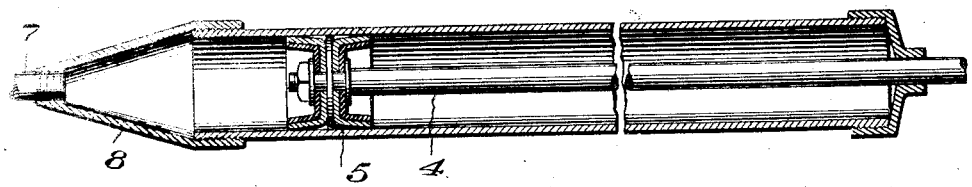
Inventor
Fred W. McNeely
By Frank C. Gore
His Attorney Patented Apr. 26, 1927.

1,625,819

UNITED STATES PATENT OFFICE.

FRED W. McNEELY, OF EVANSVILLE, INDIANA.

GREASE GUN.

Application filed October 25, 1924. Serial No. 745,894.

This invention relates to a grease gun, and has for its object the provision of a nozzle therefor of peculiar and improved shape so that the grease gun may be used for introducing and removing grease from those rear axle housings of automobiles such as Fords, Dodges, Chevrolets, and other cars where the filler plug is in the side of the housing instead of in the bottom thereof.

Heretofore, it has been almost impossible to withdraw the gritty grease from the bottoms of housings for the axles on those cars where the filler plug is in the side of the housing. Consequently, a common practice has been to add grease when the level of the grease already in the housing falls too low. This practice is not good because there remains in the housing old and gritty grease, whereas entirely new grease should be provided as the addition of fresh grease to gritty grease only results in a larger volume of gritty grease.

So far as I am aware, no attempt has been made to solve this difficulty of withdrawing gritty grease in the bottom of the housing and the purpose of my invention is the provision of a peculiarly curved spout or tube which can be inserted through the hole in the side of the housing and easily made to reach to the lowest point of the housing and turned about within the housing so that the gritty grease in the bottom of the housing may be sucked out into the barrel of the grease gun and thereafter ejected. Then, the gun can be provided with kerosene, the nozzle reintroduced into the housing for the purpose of thoroughly washing out the latter, the kerosene then being withdrawn and ejected from the gun, the latter filled with clean grease and re-introduced into the housing to properly fill the latter.

A practical embodiment of my invention is described hereinafter, set forth in the appended claims, and shown in the accompanying drawings, in which:

Figure 1 is a perspective view showing the invention as it appears when being used in connection with a rear axle housing;

Fig. 2 is a side elevation of the grease gun;

Fig. 3 is a longitudinal section, the nozzle and piston rod being broken away; and Fig. 4 is a detail view of the nozzle, partly broken away.

To illustrate the use to which the invention is to be put but without intending to limit its use, I have illustrated the grease gun and its improved nozzle in connection with the right rear axle housing of a Ford automobile.

The axle housing is shown at 1, said housing having the usual filler opening 2 in its side. Ordinarily this opening is closed by a screw plug. So far as I am aware no grease gun has been provided with a nozzle of such construction that it can be made to reach to the bottom of the housing 1 nor to be directed to different points of the housing for the purpose of withdrawing, by suction, the grease from said housing. Consequently, it is a common practice to simply add fresh grease, introduced through the opening 2 when the level of the grease gets low.

Furthermore, as non-freezing grease should be used in cold weather, whereas a different kind of grease should be used in mild weather, the owners of automobiles of the kinds set forth either have to take a chance on the grease freezing or go to considerable expense to have the housing cleaned out and filled with fresh grease.

My improved grease gun enables a car owner, garage attendant, or other person to quickly and easily remove old, gritty, grease, wash out the housing with kerosene, and introduce fresh grease whenever desired.

The barrel 3, piston rod 4, piston 5, and handle 6 may be of any approved construction, the piston being of the combined suction and pressure type so that the gun can be used to suck up the grease into the barrel 3 or to force the grease out from said barrel through the nozzle.

My improvement resides in the peculiarly shaped, novel nozzle 7. The nozzle 7 is a tube suitably connected to barrel 3 by a cap 8 and of sharply curved, or arc-shaped, form. This nozzle is of such curvature and length that when it is introduced through the opening 2, it will reach to the bottom of the housing 1 and by manipulating the grease gun, the mouth of the nozzle 7 may be moved to different points inside the housing and turned in one direction or the other, up and down, so that the suction effect of the grease gun may be exerted on the bottom of the housing and the walls thereof to the end that all of the grease may be sucked out of the housing.

The grease gun then having been removed, the grease is ejected by a reverse movement of the piston 5. Having finally removed all of the grease, the gun is filled with kerosene, the nozzle 7 again inserted in the housing, the housing thoroughly washed out inside, and the kerosene sucked back into the gun. The gun is then removed and the kerosene ejected. The gun is now filled with fresh, clean grease of the kind suited to the particular car, the nozzle 7 re-inserted through opening 2 and the grease forced into the housing. This operation is repeated until the requisite supply of grease is introduced into the housing.

The nozzle 7 is a rigid metal tube of such size that it will readily pass through the filler opening 2 with such freedom that the grease gun can be swung from one point to another to move the mouth of the nozzle to different points inside the housing. The rigid nozzle 7 is also rigidly connected to the barrel 3.

It is within the spirit of my invention to construct the arc-shaped nozzle of flexible tubing which will retain its arc-shape, as shown in the drawings.

I claim:

1. A portable grease gun having a barrel, a reciprocatory combined suction and pressure piston movable within the barrel, manual means for reciprocating the piston, and an elongated, arc-shaped, nozzle rigid throughout its length connected to one end of the barrel.

2. A portable grease gun having a barrel, a reciprocatory combined suction and pressure piston movable within the barrel, manual means for reciprocating the piston, and an elongated arc-shaped nozzle rigid throughout its length and also rigidly and detachably connected to one end of the barrel.

In testimony whereof I affix my signature.

FRED W. McNEELY.